UNITED STATES PATENT OFFICE.

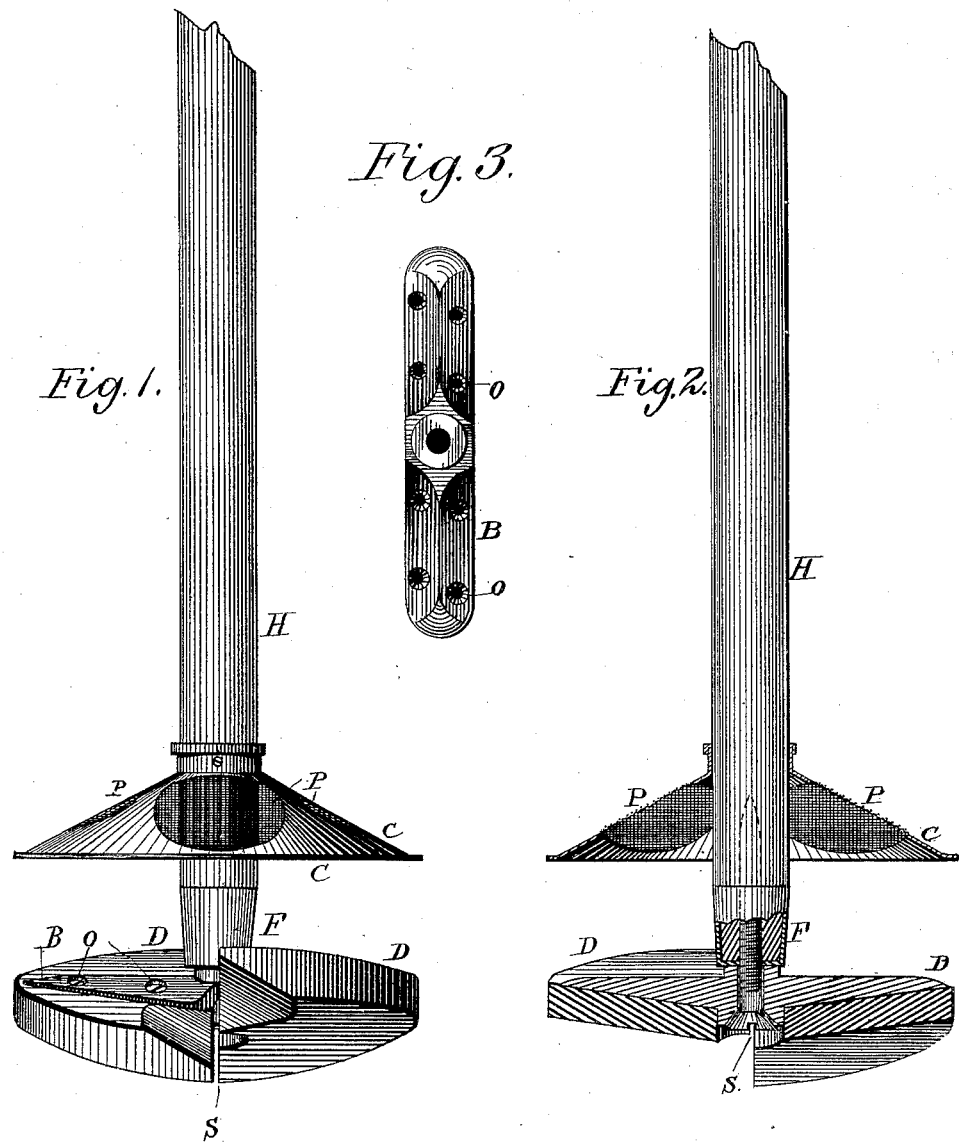

JOHN E. FINLEY, OF MEMPHIS, TENNESSEE.

CHURN-DASHER.

SPECIFICATION forming part of Letters Patent No. 419,760, dated January 21, 1890.

Application filed March 5, 1889. Serial No. 302,025. (No model.)

*To all whom it may concern:*

Be it known that I, JOHN E. FINLEY, a citizen of the United States, residing at Memphis, in the county of Shelby and State of Tennessee, have invented a new and useful Improvement in Churn-Dashers, of which the following is a specification.

My invention relates to improvements in churn-dashers in which a concave cone with holes covered with wire-gauze operates in conjunction with a divided disk secured by means of a slanting cross-bar secured upon the end of the dasher-handle by means of a screw in such a manner as to cause the divided disk to revolve by means of the pressure of the fluid upon the same when the dasher is operated.

The objects of my improvements are, first, to provide a concave cone with holes covered with wire-gauze, which is placed in a stationary manner upon the staff or handle of the dasher in such a manner as to carry a volume of air into the milk or cream, and by means of the revolving divided disk force the air and milk through the wire-gauze of the concave cone; second, to supply a self-revolving divided disk revolving upon the staff and counter-revolving as the staff is raised and lowered in the process of churning; third, to force the air into the body of the milk, and by the revolutions of the divided disk force the fluid through the meshes of the wire-gauze, and by means of the air and motion break the globules containing the butter in the least possible time, and by this means hastening the process of making the butter. I obtain these objects by means of the mechanism illustrated in the accompanying drawings, in which—

Figure 1 is a perspective view. Fig. 2 is a vertical section showing the different parts of the dasher. Fig. 3 shows the cross-bar to which the divided disk is attached.

Similar letters refer to similar parts throughout all the views.

The concave disk or cone C is secured to the staff H in a slanting manner. In this cone are the holes covered with wire-gauze P P. On the end of the staff H is the ferrule F, through which the screw S passes, securing the bar B to the staff H, so as to allow the bar B, to which the divided disks D D are attached by means of screws o o, to revolve as the dasher is operated. The dasher is used in a cylinder-shaped churn. The cross-bar B fits loosely upon the screw S in such a manner as to allow the divided disks D D to revolve and counter-revolve when the dasher is operated.

I am aware that concave disks or cones with wire-gauze covering the holes have been made and used, and that winged or self-revolving dashers have been made and used, and I do not claim a self-revolving dasher with concave cone, broadly; but

What I claim as my invention, and desire to secure by Letters Patent, is—

The dasher described, consisting of the handle H, the downwardly-conical part C, having wire-gauze-covered openings P P, and the disk D, consisting of two parts flared in opposite directions, held together by rib B, and pivoted to the lower end of the handle, as set forth.

JOHN E. FINLEY.

Witnesses:
C. W. HEIDEL,
H. F. FRANCIS.